United States Patent

Chen et al.

[11] Patent Number: 5,581,071
[45] Date of Patent: Dec. 3, 1996

[54] BARCODE SCANNER WITH ADJUSTABLE LIGHT SOURCE INTENSITY

[75] Inventors: Chin-Long Chen, Fishkill; Mu-Yue Hsiao; Surasak K. O'Trakoun, both of Poughkeepsie; Charles F. Pells, Wappingers Falls; William W. Shen, Poughkeepsie, all of N.Y.

[73] Assignee: International Business Machines Corporation, Armonk, N.Y.

[21] Appl. No.: 350,579

[22] Filed: Dec. 6, 1994

[51] Int. Cl.⁶ ................................................ G06K 7/10
[52] U.S. Cl. .................................. 235/455; 235/462
[58] Field of Search ................................ 235/455, 462

[56] References Cited

U.S. PATENT DOCUMENTS

| | | | |
|---|---|---|---|
| 3,774,014 | 11/1973 | Berler | 235/471 |
| 4,136,821 | 1/1979 | Sugiura | 235/462 |
| 4,500,776 | 2/1985 | Laser | 235/462 |
| 4,734,566 | 3/1988 | Senda et al. | 235/455 |
| 4,833,306 | 5/1989 | Milbrett . | |
| 5,010,241 | 4/1991 | Butterworth | 235/462 |
| 5,148,008 | 9/1992 | Takenaka | 235/455 |
| 5,177,346 | 1/1993 | Chisholm . | |
| 5,302,812 | 4/1994 | Li et al. | 235/462 |
| 5,308,966 | 5/1994 | Danielson et al. | 235/467 |
| 5,349,172 | 9/1994 | Roustaei | 235/472 |
| 5,378,883 | 1/1995 | Batterman et al. | 235/455 |
| 5,396,054 | 3/1995 | Krichever et al. | 235/462 |
| 5,430,282 | 7/1995 | Smith et al. | 235/455 |

*Primary Examiner*—John Shepperd
*Attorney, Agent, or Firm*—Lawrence D. Cutter

[57] ABSTRACT

A barcode scanner, which is particularly suitable for reading barcode information from surfaces having various reflective properties, includes a light intensity control for the light source of the barcode scanner. The light intensity control preferably comprises a means for ramping voltage and a summing circuit which allows the current flowing through the light source to be controlled. In addition, the light intensity control utilizes a clocking means which controls the rate of voltage ramping.

9 Claims, 6 Drawing Sheets

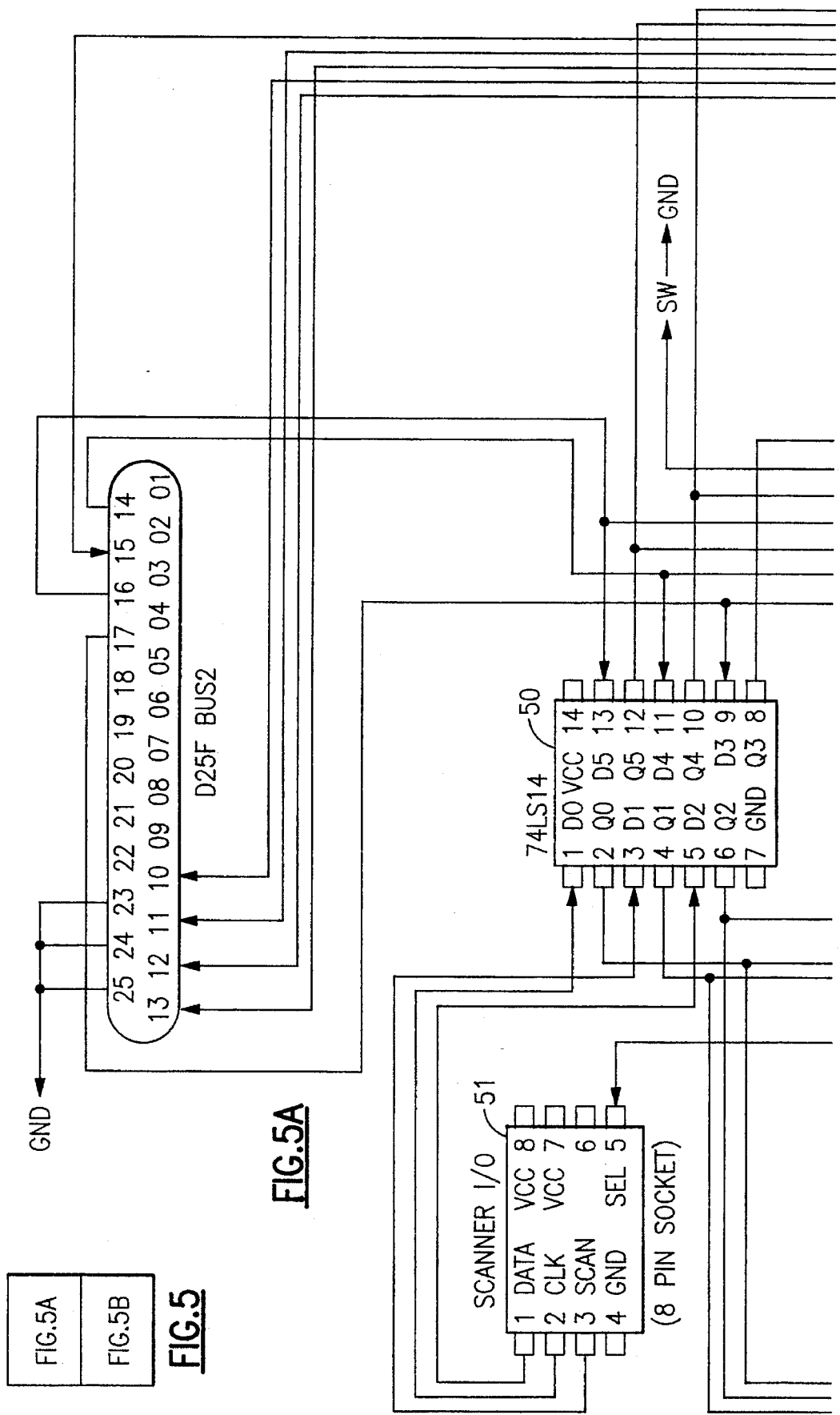

BARCODE SCANNER WITH ADJUSTABLE LIGHT SOURCE INTENSITY

CROSS REFERENCE TO RELATED APPLICATIONS

This application contains subject matter which is related to the subject matter of the copending patent application titled "Barcode Scanner for Poor or Low Contrast Surfaces" by C. L. Chen et al, Ser. No. 08/260,125, Filed: Jun. 15, 1994. The above mentioned copending application is hereby incorporated by reference.

BACKGROUND OF THE INVENTION

The present invention is generally directed to barcode scanners which are useful for reading barcodes on surfaces which exhibit different reflectivities. More particularly, the present invention is directed to a bar code scanner employing a broad spectrum light source of adjustable intensity which is made to vary in order to accommodate different surfaces on which the barcode is disposed.

There is a need in the barcode scanning or reading area to improve readability with respect to barcodes placed on a variety of different surfaces. Such surfaces include silicon semiconductor wafers, magneto restrictive disk drive elements, polymeric materials employed in the manufacture of CD ROM disks, glass, such as that used in the manufacture of cathode ray tubes, and various forms of plastic material. In particular, there is a need to be able to read barcodes disposed on surface structures which have different reflectivities. For example, the surface of a semiconductor wafer may have different colors when it has gone through various chemical processes such as alkaline and acid etchings. These colors can affect reflectivity and readability of barcodes placed thereon by laser etching.

Barcode scanners which use a CCD camera and employ lasers as light sources, such as those typically seen in a supermarket checkout counter, are however not capable of reading barcodes placed on materials having a wide range of reflectivities. Nonetheless it is very desirable to place barcode information on such surfaces. Similarly, barcode scanners which employ light emitting diode (LED) devices as the light source, are found not to be optimal for reading barcodes which are present on materials of differing reflectivity. One of the reasons that barcode scanners are unsuccessful with such materials is that the intensity of the light from the light source is fixed and is not adjusted according to the reflectivity of the material on which the barcode is placed.

It has been discerned by the present inventors that, by providing adjustable aspects to a barcode reader, it is possible to enhance the reliability of barcode reading. In particular, it has been discerned by the present applicants that, when a barcode is written on a surface with a certain reflectivity, it is desirable to vary the intensity of the light source to improve readability. In particular, applicants have also discerned that light intensity should be decreased for highly reflective surfaces and increased for surfaces with low reflectivity.

SUMMARY OF THE INVENTION

In accordance with a preferred embodiment of the present invention, a barcode scanner comprises a CCD chip, a lens, an analog to digital converter and an adjustable light source which is connected to a light intensity control. In the present invention, the light source is a broad spectrum source which includes light from a range of frequencies within the visible spectrum. In particular, both incandescent and fluorescent light sources are employable. Incandescent light sources have an advantage in that they offer ease with respect to control of light intensity. In a preferred embodiment, a light intensity control is provided which includes a voltage ramp generator connected to a summing circuit. The voltage ramp generator and the summing circuit work together to produce 16 voltage levels and to thus control the current flow in a transistor which thus controls the intensity of the light source.

Accordingly, it is an object of the present invention to provide a barcode scanner with an adjustable light source which is capable of reading barcodes from a number of different substrates including, but not limited to, silicon wafers, CD-ROMs, glass and ceramic substrates.

It is also a further object of the present invention to provide a barcode scanner light source which exhibits a broad spectrum of light output in the optical frequency range.

It is a still further object of the present invention to provide a barcode scanner which is particularly well suited for reading barcodes present on semiconductor wafers which, because of variations in processing, exhibit different background colors.

Lastly, but not limited hereto, is an object of the present invention to provide a barcode scanner having a light source which controls the intensity of the light in order to read barcodes placed on materials with different reflectivities.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 5 shows the relationship of FIGS. 5A and 5B to each other. FIGS. 5A and 5B are a combination functional and electrical schematic diagram illustrating the connection of integrated circuits employed in one embodiment of a bar code scanner in accordance with the present invention.

DETAILED DESCRIPTION OF THE INVENTION

Figure 1:
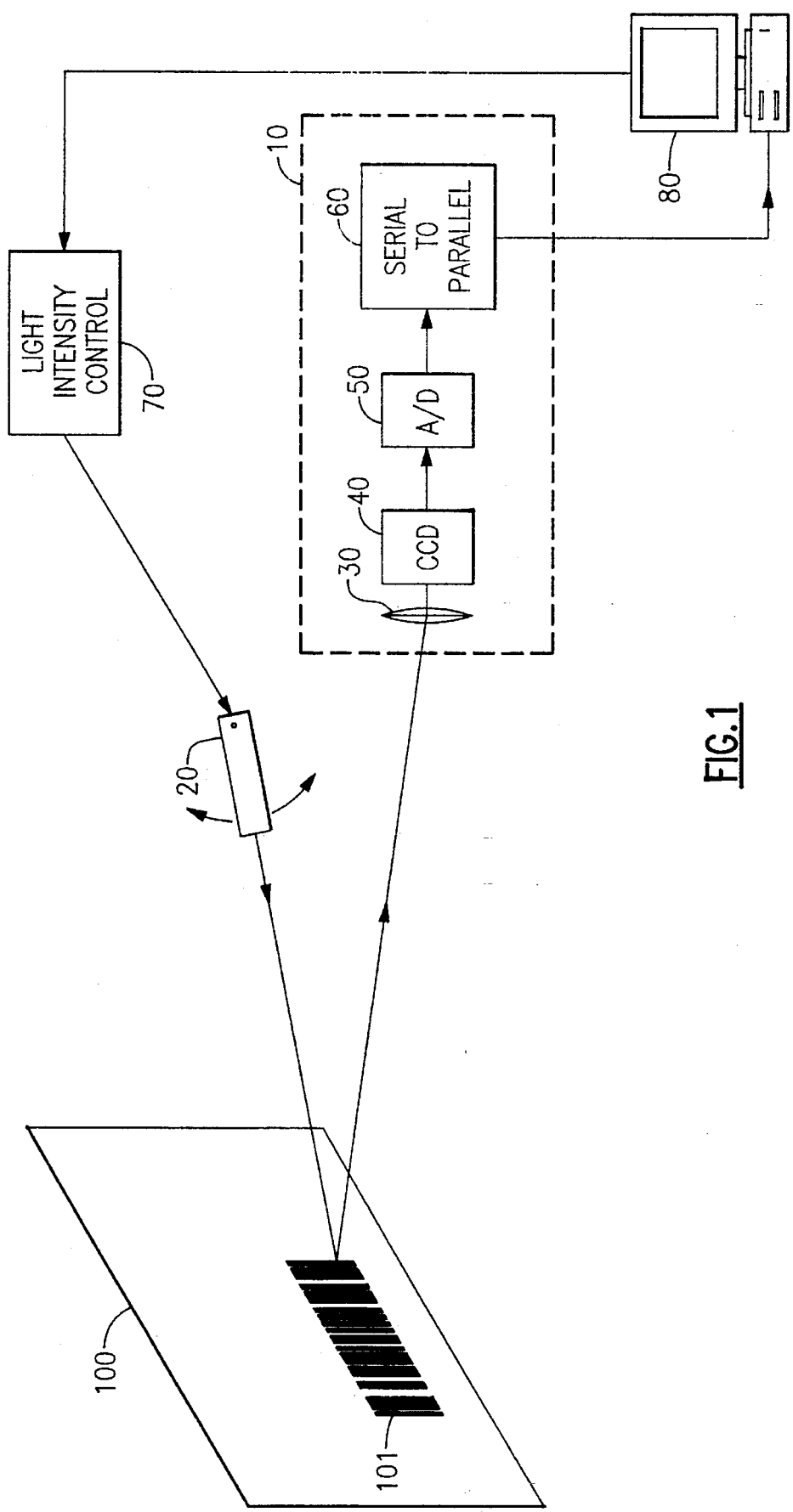
FIG. 1 is a functional block diagram illustrating the overall organization of the present invention.

FIG. 1 illustrates, in functional block diagram form, the overall operation of a barcode scanner constructed in accordance with the present invention. In particular, pivotally adjustable light source 20 is directed, at a selectable angle, toward substrate 100 containing barcode pattern 101 which is to be read. The light image reflected from substrate 100 is directed through lens 30 onto charge coupled device 40 whose electrical output is supplied to analog-to-digital converter 50 which produces a serial output stream which is preferably converted to an 8-bit parallel stream (by serial to parallel converter 60) which is supplied to personal computer 80 or other computational mechanism for decoding. If barcode pattern 101 is not able to be read, then light intensity control unit 70 operates to increase the light intensity from light source 20 until the barcode pattern is read clearly and decoded.

Figure 2:
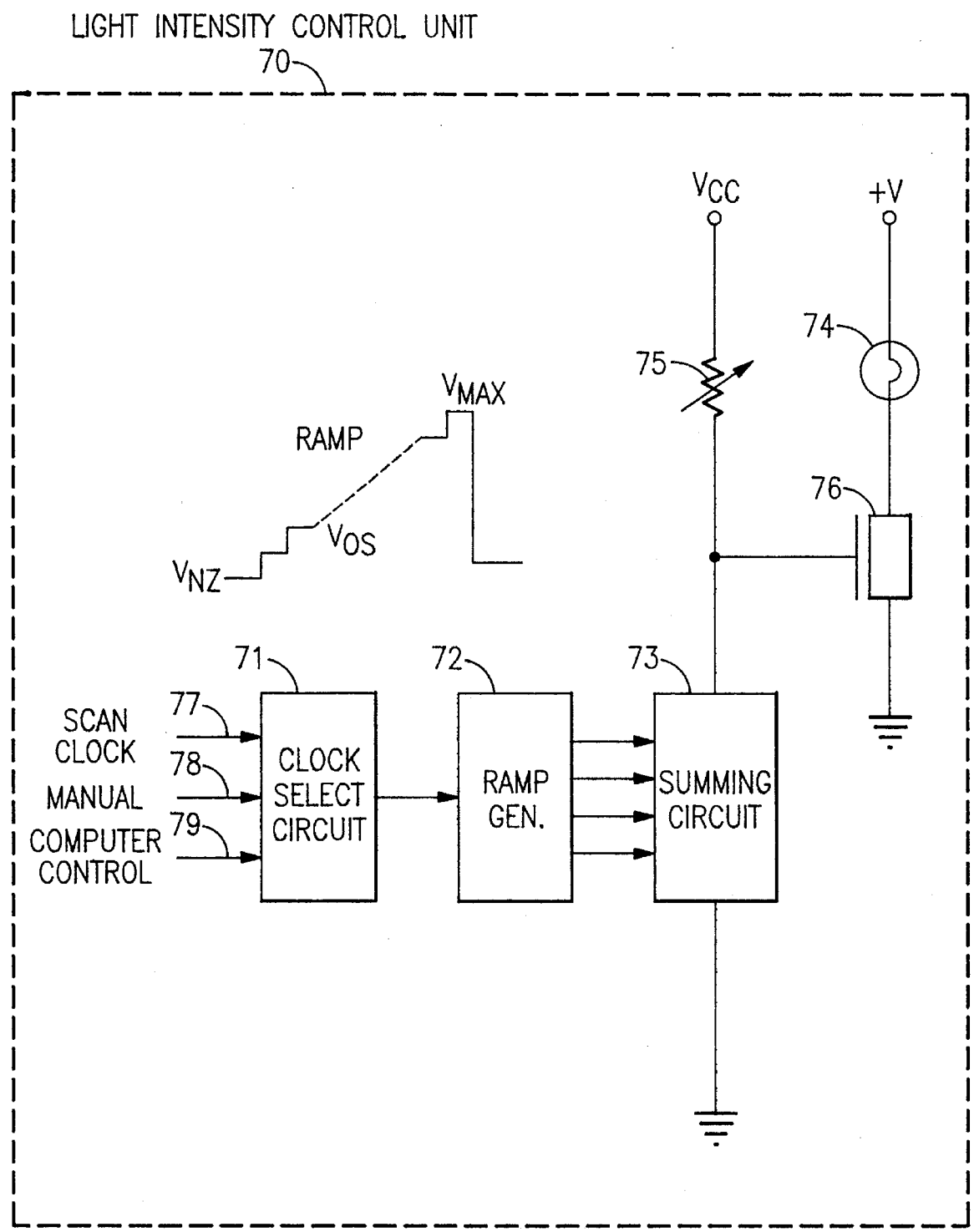
FIG. 2 is a combination functional and electrical schematic diagram illustrating the connection of clocking means and circuit components to form a light intensity control unit.

An operable light intensity control in accordance with the present invention is shown in FIG. 2. In particular, it is seen that clock select circuit 71 selects the mode which controls the speed of the voltage ramping which occurs in ramp generator 72. The voltage can be ramped from a higher voltage to a lower voltage or vice-versa. One clock mode utilizes the scan clock of CCD 40. A second clock mode is a manual or push button mode in which the user of the present invention manually controls the voltage ramping. A third mode is based on feedback from computer 80. That feedback loop is schematically shown in FIG. 1. In the feedback mode the personal computer or other decoding mechanism controls the voltage ramping and ramps the voltage until proper decoding of the barcode pattern is achieved.

Once the barcode reading device is switched on, an initial or offset voltage is set using variable resistor 75. The initial or off-set voltage lies between the maximum voltage, $V_{max}$, and a minimum non-zero voltage, $V_{NZ}$. The clocking mode is then selected and the voltage is ramped upward in ramp generator 72. Ramp generator 72 and summing circuit 73 produce a set of sixteen voltage levels, which range from a maximum voltage to a minimum non-zero voltage. These voltage levels control the current flow in transistor 76 and thus determine the intensity of light produced by light source 74. While sixteen discrete levels of light intensity are preferred, fewer or greater numbers of levels may be employed.

Figure 3:
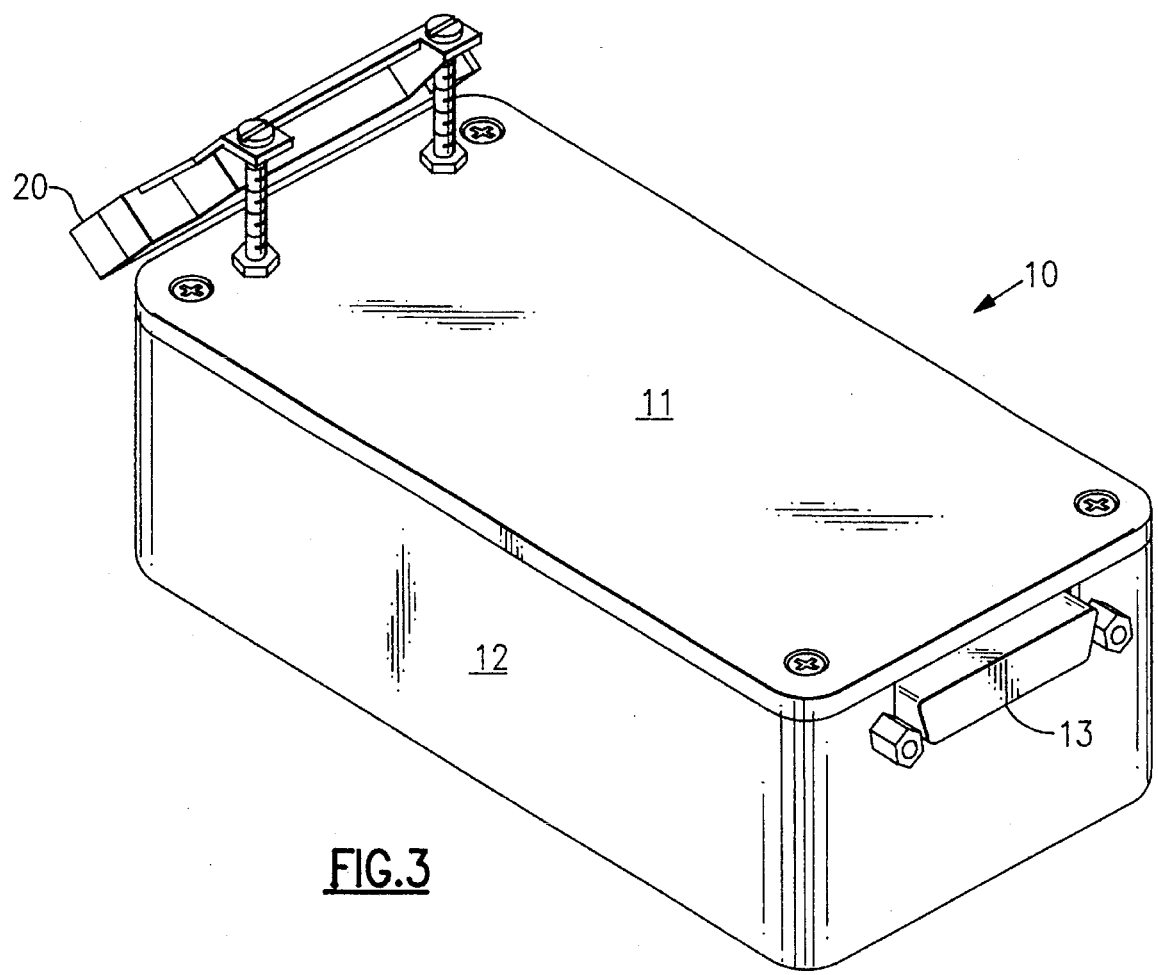
FIG. 3 is an isometric view illustrating one embodiment of a bar code scanner in accordance with the present invention.
Figure 4:
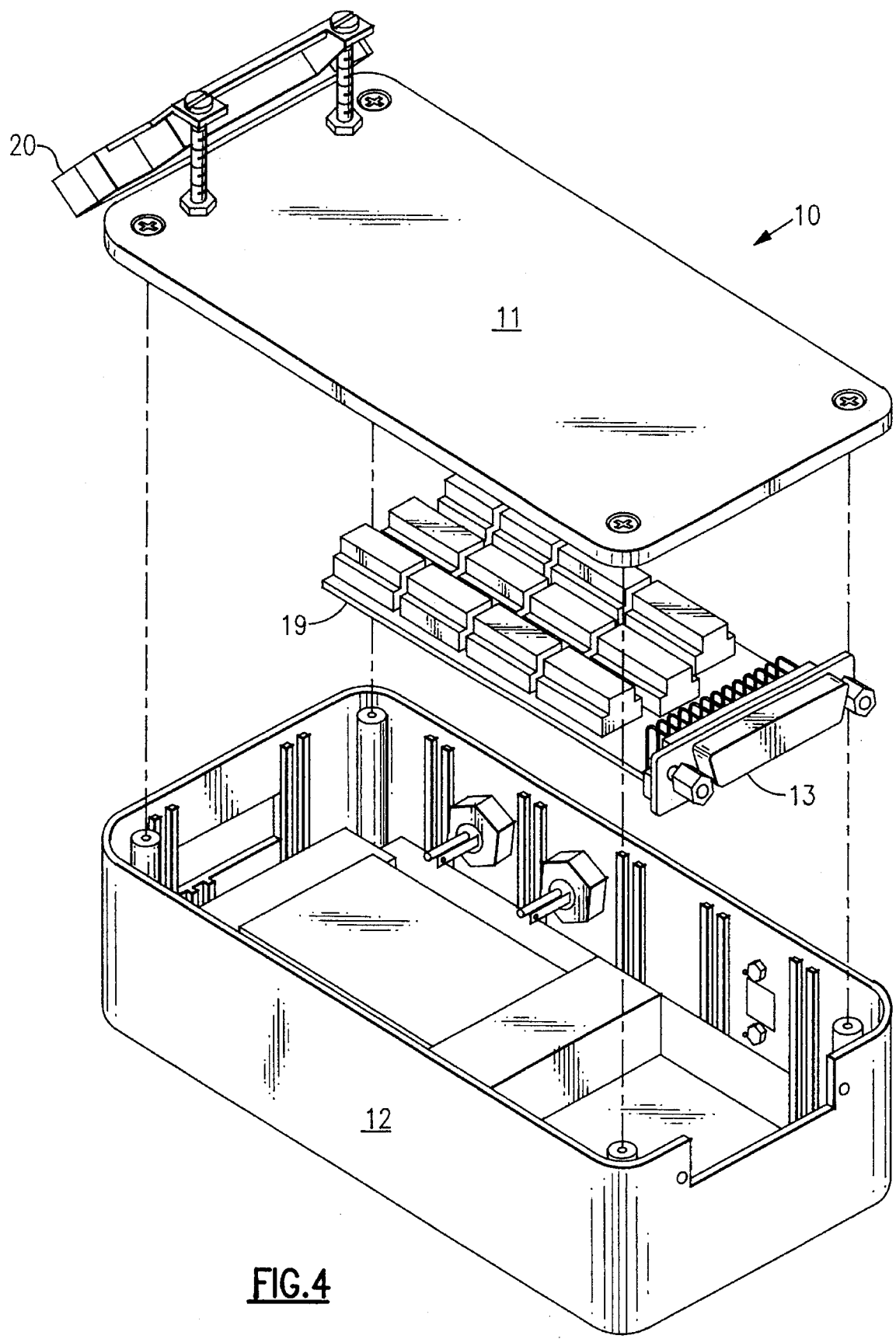
FIG. 4. is an exploded view of the barcode scanner shown in FIG. 3.

An operable unit in accordance with the present invention is shown in FIG. 3. It is seen that housing 10 includes cover or lid 11 which seals the top of case 12. Directionally adjustable light source 20 is affixed at one end of cover 11. Just below the other end of cover 11 there is provided parallel port connector 13 for ease of supplying signals to a standard personal computer parallel port. FIG. 4 illustrates the same device shown in FIG. 3 except that an exploded view is shown so as to more particularly provide a view of printed circuit board 19. In preferred embodiments of the present invention, light intensity control 70 is disposed within housing 10.

Figure 5B:
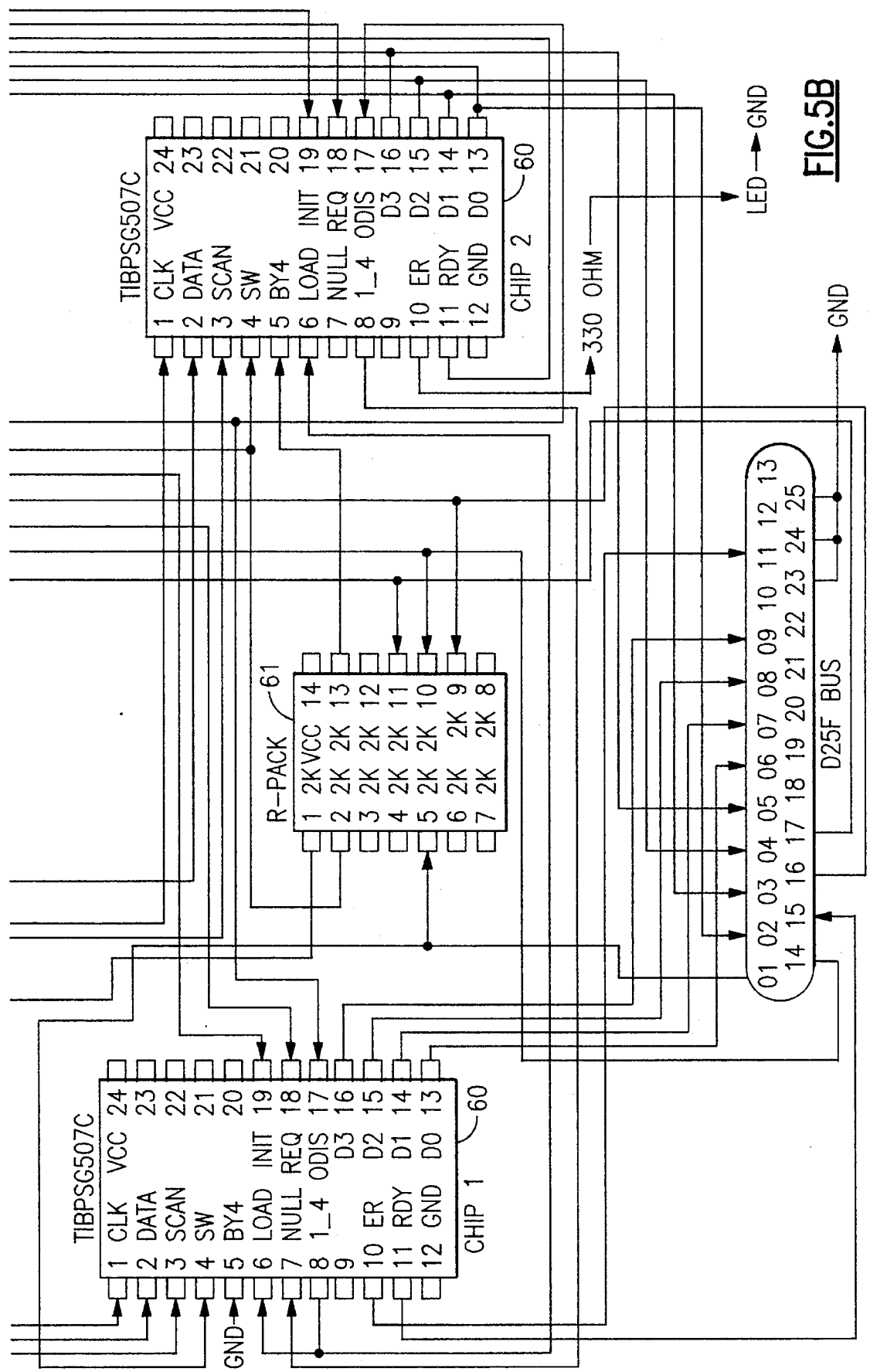

FIGS. 5A and 5B illustrate the connections between analog-to-digital converter 50 and serial-to-parallel converter chips 60. The serial-to-parallel converter chips are implemented in the present invention in the form of integrated circuit chip devices TIBSG507C as supplied by Texas Instruments Inc. The analog-to-digital converter is implemented in the form an integrated circuit chip 74LS14. The output from CCD chip device 40 is supplied to 8-pin socket 51. Also employed in the circuit shown in FIG. 5B is integrated circuit resistor pack 61 which also illustrates power line input connection $V_{cc}$. Also shown in FIG. 5B are the connections to 25-pin D-connector parallel port 13.

From the above, it should be appreciated that the intensity of a light source for a barcode scanner can be adjusted. By varying the intensity of the light source a barcode scanner is provided with a degree of adaptability which is well suited to reading barcode symbols present on materials of various reflectivities.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A barcode scanner system for reading barcodes, said system comprising:

a housing having an opening at one end thereof;

a charge coupled device disposed within said housing;

a lens positioned in front of said charge coupled device, said lens being disposed so as to be accessible to light entering said opening to focus said light onto said charge coupled device;

a light source, disposed exterior to said housing to illuminate said barcodes;

decoder means for receiving signals from said charge coupled device; and a light intensity control means for varying the intensity of light produced by said light source until said decoder indicates that a scanned barcode has been detected.

2. The scanner of claim 1 in which said light intensity control means includes a ramp generator and a summing circuit.

3. The scanner of claim 2 wherein the speed of said voltage ramping is controlled by a clocking means.

4. The scanner of claim 3 wherein said clocking means is manually controllable.

5. The scanner of claim 3 wherein said clocking means is controllable by a computer in response to decoding determination.

6. The scanner of claim 3 wherein said clocking means is controlled by a scan signal from said charge coupled device.

7. The scanner of claim 1 wherein said light source comprises at least one incandescent lamp.

8. The scanner of claim 1 wherein said light intensity control means is disposed within said housing.

9. A barcode scanner system for reading barcodes, said system comprising:

a housing having an opening at one end thereof;

a charge coupled device disposed within said housing;

a lens positioned in front of said charge coupled device, said lens being disposed so as to be accessible to light entering said opening to focus said light onto said charge coupled device;

a light source, disposed exterior to said housing to illuminate said barcodes;

decoder means for receiving signals from said charge coupled device; and a light intensity control means for continuously varying the intensity of light produced by said light source until said decoder indicates that a scanned barcode has been detected.

\* \* \* \* \*